E. HESS.
SPRING VEHICLE TIRE.
APPLICATION FILED SEPT. 23, 1910.
989,973.
Patented Apr. 18, 1911.
2 SHEETS—SHEET 1.
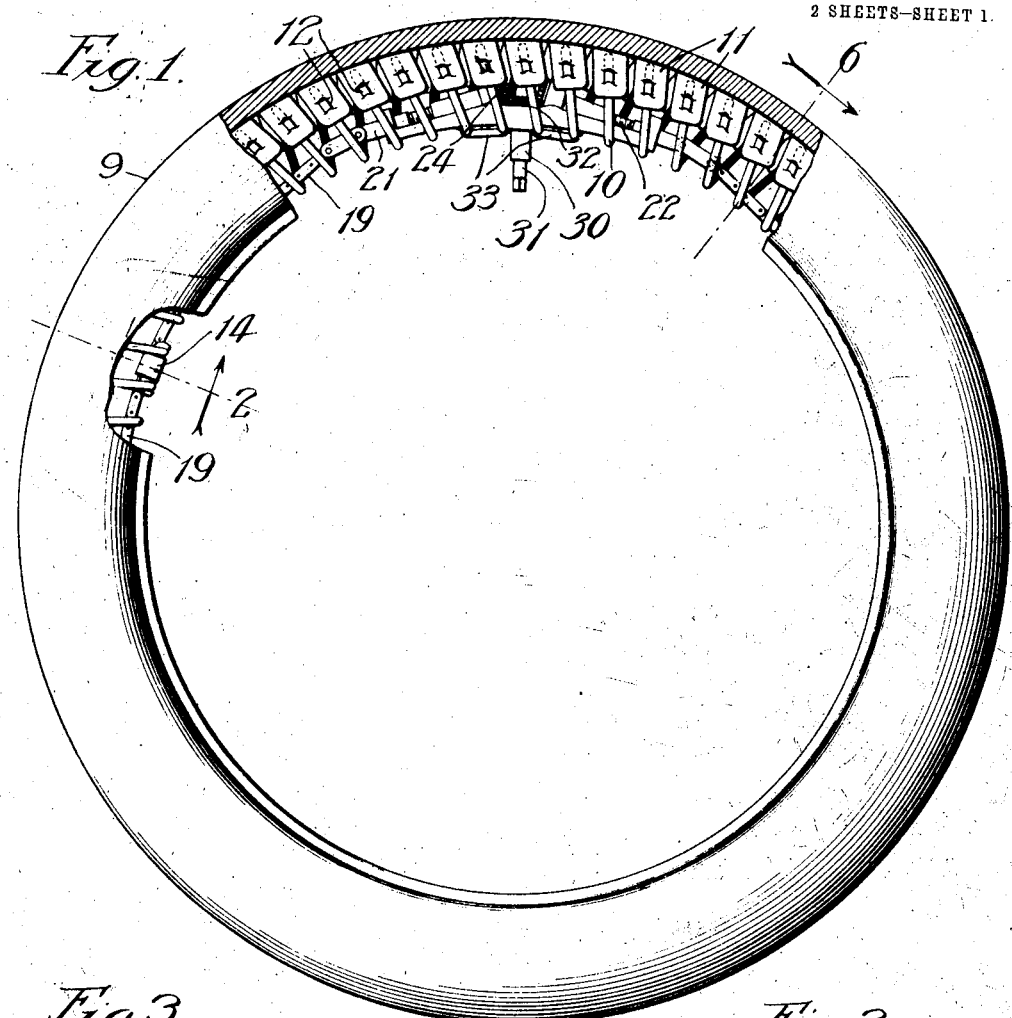
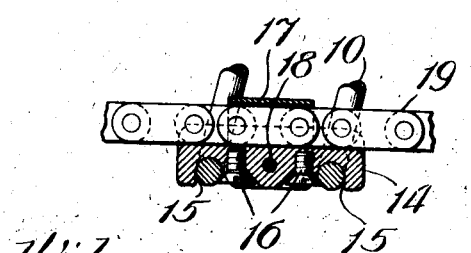
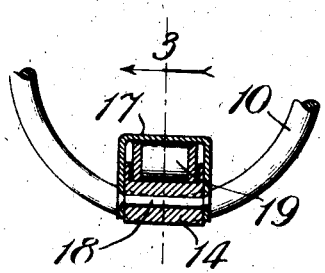
Inventor:
Edward Hess, E. HESS.
SPRING VEHICLE TIRE.
APPLICATION FILED SEPT. 23, 1910.
989,973.
Patented Apr. 18, 1911.
2 SHEETS—SHEET 2.
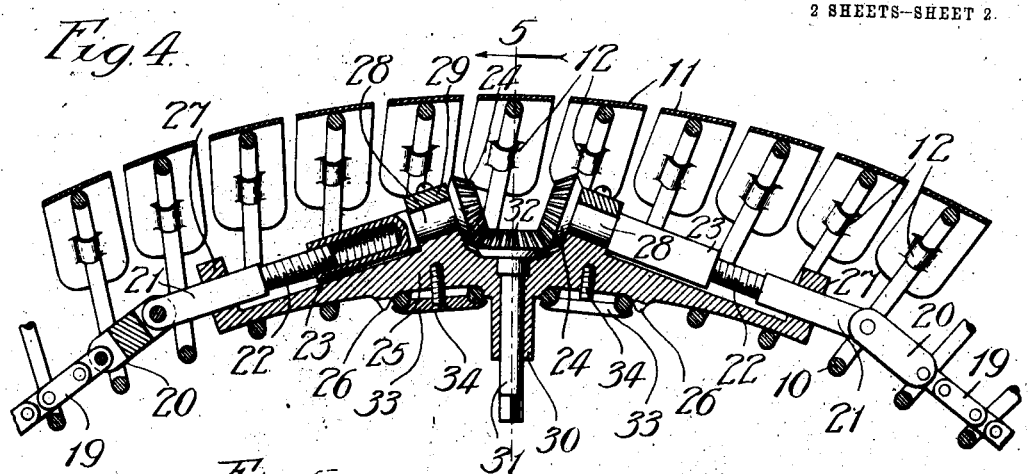
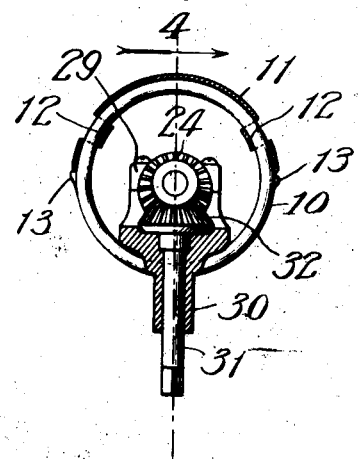 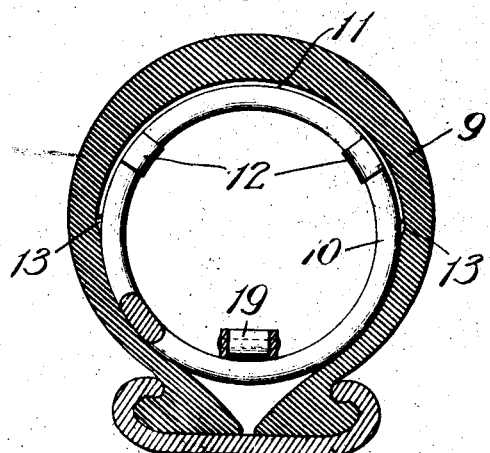
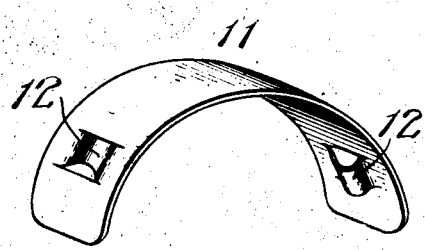
Witnesses:
Chas. E. Gaylord
G. F. Chase
Inventor:
Edward Hess,
By Dyrenforth, Lee, Chritton & Wiles,
Attys.

UNITED STATES PATENT OFFICE.

EDWARD HESS, OF CHICAGO, ILLINOIS.

SPRING VEHICLE-TIRE.

989,973.

Specification of Letters Patent. Patented Apr. 18, 1911.

Application filed September 23, 1910. Serial No. 583,380.

*To all whom it may concern:*

Be it known that I, EDWARD HESS, a citizen of the United States, residing at Chicago, in the county of Cook and State of Illinois, have invented a new and useful Improvement in Spring Vehicle-Tires, of which the following is a specification.

My invention relates to an improvement in the class of spring-tires for vehicles in which the tire comprises an endless spring-coil confined about the wheel-rim and enveloped in a casing.

The object of my invention is to provide a spring-cushion tire in the class referred to which shall be practically as desirable in every way as the pneumatic tire without the objections to the latter including, more particularly, tendency to burst and relative lack of strength and durability.

In the accompanying drawings, Figure 1 shows my improved tire by a view in side elevation with parts of the casing broken away to disclose structural details of the incased spring-member; Fig. 2 is an enlarged broken section through the spring-member on line 2, Fig. 1, showing a loop-detail for the spring-tightening chain; Fig. 3 is a section on line 3, Fig. 2; Fig. 4 is a section of a broken portion of the spring-member on line 4, Fig. 5; Fig. 5 is a section on line 5, Fig. 4; Fig. 6 is an enlarged section on line 6, Fig. 1, and Fig. 7 is a full-size perspective view of one of the shoes with which each coil of the spring is provided on its tread-portion.

The wheel-rim 8 and casing 9 may be of the known type illustrated or of any other that is suitable. The spring 10, which is endless, is a coiled metal spring fastened about the rim 8 and provided on the tread-portion of each coil with a shoe 11, preferably of sheet-metal curved to conform to the arc of the coil, which passes through eyes 12 near the ends of the shoe to render it pivotal on its support; and stops 13 (Fig. 5) may be provided on each coil at the ends of the shoe to prevent the latter from slipping about the spring. At suitable intervals about the inner periphery of the spring it is reinforced by braces 14 interposed between adjacent coils. The brace shown is of general yoke-shape with transverse grooves 15 near its ends to receive the coils, to which the brace is rigidly fastened by the heads of screws 16 inserted into the inner side of the yoke; and a loop 17 straddles the yoke midway between its ends and is fastened thereto through its wings by a pin 18. Only one of these looped reinforcing devices is disclosed, in Fig. 1, its detailed construction being illustrated in Fig. 3, but the same device may be understood to be provided in three or four places, equidistant apart, about the spring.

For tightening the spring about the rim a band in the preferred form of a chain 19 is employed. The chain passes, for its retention in place and guidance, through the loops 17. Each end of the chain is flexibly connected with the adjacent end of a relatively large link 20, the opposite end of which is pivoted to the stem 21 of a screw 22 which works in an internally threaded socket or nut 23 terminating in a beveled gear 24. A concavo-convex metal plate 25, curved to conform to the arc of the spring 10, seats inside the latter and is provided on its under side with projections 26 to engage adjacent coils and thus tend to stop the plate against longitudinal displacement. The screw-stems 21 work in bearings 27 on the ends of the plate 25, and trunnion-sections 28 of the nuts 23 work in bearings 29 on the plate at opposite sides of its transverse center, where it is provided with a bearing 30 for the key-operated stem 31 of a beveled gear 32 meshing with the gears 24. The spring is shown to be further stayed by braces 33, at opposite sides of the bearing 30, engaging adjacent coils and fastened to the inner face of the plate 25 by screws 34.

With the spring surrounding a rim 8 and enveloped in a casing 9, the bearing 30 and stem 31 extend through an opening in the rim, in the same way as does the valve of a pneumatic tire. To tighten the spring a key (not shown) is applied to the stem 31 to turn it in one direction and thereby rotate the gears with the effect of causing the nuts to draw into them the screws 22, thus firmly binding the chain against the springs and tightening it about the rim; and by turning the key in the opposite direction the chain is relaxed to permit removal of the casing and spring. The braces prevent torsional movement of the spring under the strains to which the tire is subjected in use, and the pivotal shoes ride along the road-bed with a step-like action and tend to distribute the load over the entire portion of the tread in contact with the road-bed, with the effect of rendering the riding of the tire easy and smooth.

What I claim as new and desire to secure by Letters Patent is —

1. In a spring tire, the combination of a continuous spiral spring seating about a wheel-rim inside a casing, independent curved metal shoes in series about the spring pivotally supported on the coils thereof to extend about their tread-portions and rock thereon in the direction of running the wheel, and a band about the rim within the spring for securing the latter in place, for the purpose set forth.

2. In a spring tire, the combination of a continuous spiral spring seating about a wheel-rim inside a casing, a band about the rim within the spring for securing the latter in place, braces at intervals about the seating portion of the spring connecting successive coils thereof, loops extending from the braces into the path through the spring of said band and through which it passes for its confinement, and means at the opposing ends of the band for tightening it, for the purpose set forth.

3. In a spring tire, the combination of a spiral spring seating about a wheel-rim inside a casing, a band about the rim within the spring for securing the latter in place, a metal plate seating inside the spring at the band-ends and provided with bearings, links on the ends of the band terminating in screws, nuts journaled in said bearings and working on said screws, beveled gears on the adjacent ends of the nuts, and a key-operated stem journaled in said plate to extend through the rim and provided on its inner end with a beveled gear meshing with the gears on said nuts, for the purpose set forth.

EDWARD HESS.

In presence of—
J. G. ANDERSON,
R. A. SCHAEFER.